United States Patent [19]
Casselden

[11] Patent Number: 5,773,913
[45] Date of Patent: Jun. 30, 1998

[54] PIEZOELECTRIC SENSORS

[75] Inventor: Ian Casselden, Bexhill-On-Sea, Great Britain

[73] Assignee: Sensor Systems (Jersey) Limited, St. Helier, Great Britain

[21] Appl. No.: 732,362

[22] PCT Filed: Apr. 25, 1995

[86] PCT No.: PCT/GB95/00939

§ 371 Date: Oct. 25, 1996

§ 102(e) Date: Oct. 25, 1996

[87] PCT Pub. No.: WO95/29389

PCT Pub. Date: Nov. 2, 1995

[30]     Foreign Application Priority Data

Apr. 25, 1994  [GB]   United Kingdom ................... 9408189

[51] Int. Cl.$^6$ .............................. H01L 41/04; G01F 23/28
[52] U.S. Cl. ......................... 310/338; 310/337; 73/290 V
[58] Field of Search .................................... 310/338, 337, 310/322, 321, 312, 334, 336; 141/94; 73/290 R, 304 R, 290 V

[56]              References Cited

U.S. PATENT DOCUMENTS 3,220,258  11/1965  Rod ....................................... 73/290 R
4,446,454   5/1984  Pyle ......................................... 340/538
4,679,160   7/1987  Whitener ................................ 364/563
5,349,994   9/1994  Koeninger ................................ 141/94

FOREIGN PATENT DOCUMENTS

515254A1  11/1992  European Pat. Off. .

*Primary Examiner*—Mark O. Budd
*Assistant Examiner*—Timothy A. Williams
*Attorney, Agent, or Firm*—Edwin E. Greigg; Ronald E. Greigg

[57]              ABSTRACT

A piezoelectric sensor probe comprises an elongate insulative support member supporting a plurality of piezoelectric sensing elements spaced along the length of the member, the support member has respective conductors extending from one end of the member to each of the sensing elements for conducting electrical signals to and from each sensing element.

20 Claims, 9 Drawing Sheets

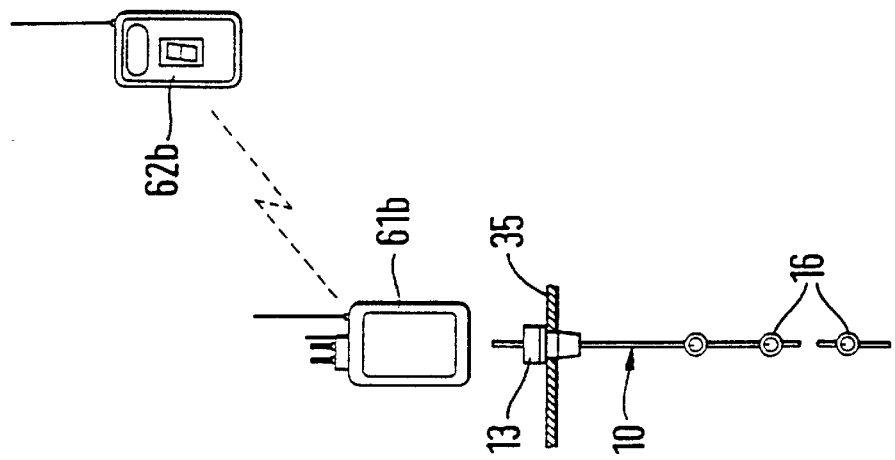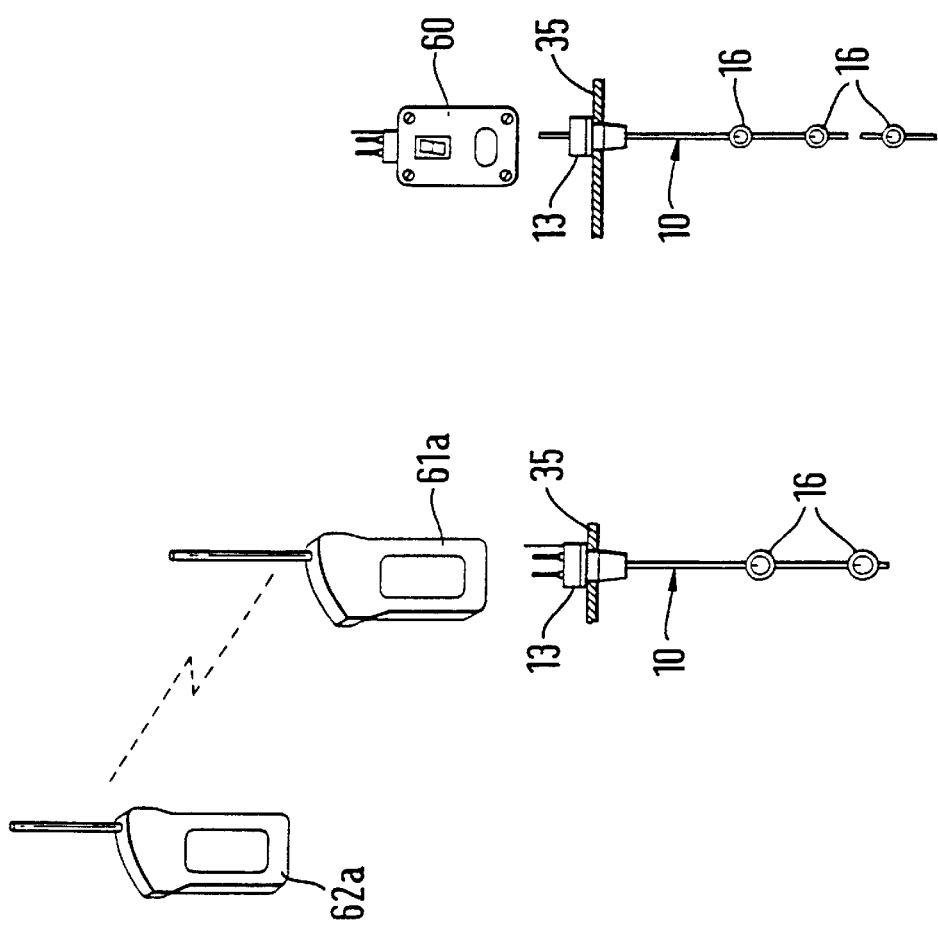

PIEZOELECTRIC SENSORS

This invention relates to a piezoelectric sensor probe for sensing a characteristic of a medium surrounding the probe. The invention has particular application to sensing the level of oil in an oil storage tank of the type used in domestic central heating. For a domestic user, it is essential to know when the oil in such a tank is running low, and for the tanker driver it is essential to know when the tank is full.

Apart from manual inspection and the use of a dipstick, present methods of sensing the level of oil in a storage tank make use of level gauges, such as the Atkinson type, which rely on a visible sighting of fluid in a transparent tube. However, such tubes frequently become dirty and/or blocked, and there is a substantial risk of fluid leakage.

GB-A-2097964 shows a pair of piezoelectric sensors spaced one above the other to detect the level of liquid around a submersible pump. Each sensor forms part of a respective oscillator circuit which oscillates only if the medium surrounding the element has the appropriate acoustic impedance, and each sensor is received in a recess in the outer casing of the pump.

EP-A-0515254 discloses a fluid level indicator having vertically spaced piezoelectric emitters carried on an insulating support which also carries the conductors for conducting electrical signals to the respective emitters. The emitters are excited sequentially, and the emitted signals are received by a common receiver carried on a separate vertical support spaced from the support carrying the emitters.

U.S. Pat. No. 3,220,258 discloses a liquid level detector in which spaced apart electro-acoustic transducers are supported on a rigid wall, plate or post. The transducers may be piezoelectric devices and may form the resonant element in a crystal oscillator. Changes in impedance or frequency of oscillation of the transducer are detected to determine the level of the liquid.

EP-A-0384373 has a sound emitter at the bottom of a fuel tank for emitting pulses of ultrasound into the liquid, the pulses being reflected at the interface between the light and heavy oils. A receiver at the bottom of the tank receives the reflected pulses, and can be combined with the emitter to form an electro-acoustic crystal. A probe stick extending into the fuel tank carries additional electro-acous zic receivers one above the other which receive the emitted soundwaves and pass electrical signals along wires in a tube forming part of the probe stick.

According to the present invention there is provided a piezoelectric sensor probe comprising an elongate insulative support member supporting a plurality of piezoelectric sensing elements spaced along the length of the member, the support member having respective conductors extending from one end of the member to each of the sensing elements for conducting electrical signals to and from each sensing element, characterised in that each sensing element is mounted on the support member in spaced relationship therewith such that the sensing element is free to vibrate substantially independently of the support member when an electrical signal is applied thereto.

Preferably, an electrical connector is provided at the end of the support member for connecting the respective conductors from each sensing element to a monitoring circuit for monitoring an electrical characteristic of the sensing elements dependent on the medium surrounding the sensing element. For example, in a fluid level detector, the monitor circuit monitors a characteristic dependent on the presence or absence of a fluid at the level of the respective elements. The electrical characteristic may comprise, for example, the resonant frequency of the sensing element.

The support member preferably comprises a strip of printed circuit board, and the conductors then comprise conductive tracks on the board.

The piezoelectric sensing element preferably comprises a piezo ceramic disc bonded to a metal resonating plate, the plate being secured to the printed circuit board in a spaced relationship therewith and being electrically connected to one or more of the conductive tracks on the printed circuit board.

A sensor embodying the present invention can be used in a method of filling a storage tank with fluid supplied from a location remote from the tank. In this case, with the sensor probe inserted into the tank and with a radio transmitter fitted to the probe for transmitting an output signal from the monitor circuit, a first signal is transmitted from the sensor to a receiver at the remote location when the fluid in the tank reaches a first sensing element, and a second signal is transmitted from the sensor to the receiver when the fluid in the tank reaches a second of the sensing elements. In this manner the rate of filling can be reduced in response to the first signal indicating that the tank is almost full, and filling can be terminated in response to the second signal indicating that the tank is full.

Accordingly, when filling oil storage tanks from tanker vehicles, the tanker driver is able to energise the transmitter so that the sensor signals can be transmitted from the storage tank to the vehicle without the tanker driver having to leave the vehicle.

To assist in a fuller understanding of the above and other aspects of the present invention, an embodiment will now be described by way of example oily with reference to the accompanying drawings in which:

FIGS. 4a, 4b and 4c shows three different applications of the probe;

Figure 1:
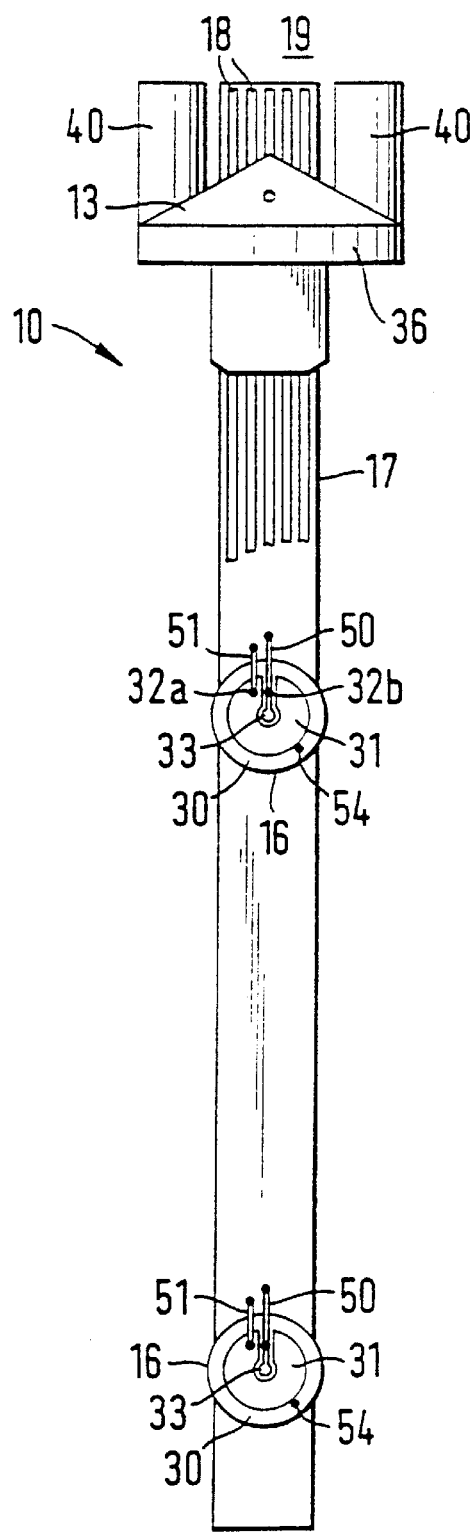
FIG. 1 is a diagrammatic plan view of a fluid level sensor probe and connector embodying the invention.

Referring to FIGS. 1–6 of the drawings, an elongate fluid level sensor probe 10 consists of piezo ceramic sounder elements 16 spaced apart along a strip 17 of printed circuit board. Each element consists of a thin copper. brass or stainless steel resonating plate 30 bonded to a piezo ceramic disc 31. The disc 31 has silver electrodes 32 connected to respective conductive tracks 18 on the printed circuit board. For the sake of clarity, the tracks 18 are shown only at the top end of the probe.

When an electrical signal is applied to this element the piezo ceramic disc 31 expands or contracts slightly causing the metal resonating plate 30 to bend. A positive voltage expands the -piezo disc and develops a convex shaped element while conversely a negative voltage will contract the piezo disc and develop a concave element. A separate voltage generating island 33 is provided on the piezo ceramic disc 31 which is used to feed back a signal at the resonant frequency of the assembly to the drive circuit.

Figure 2:
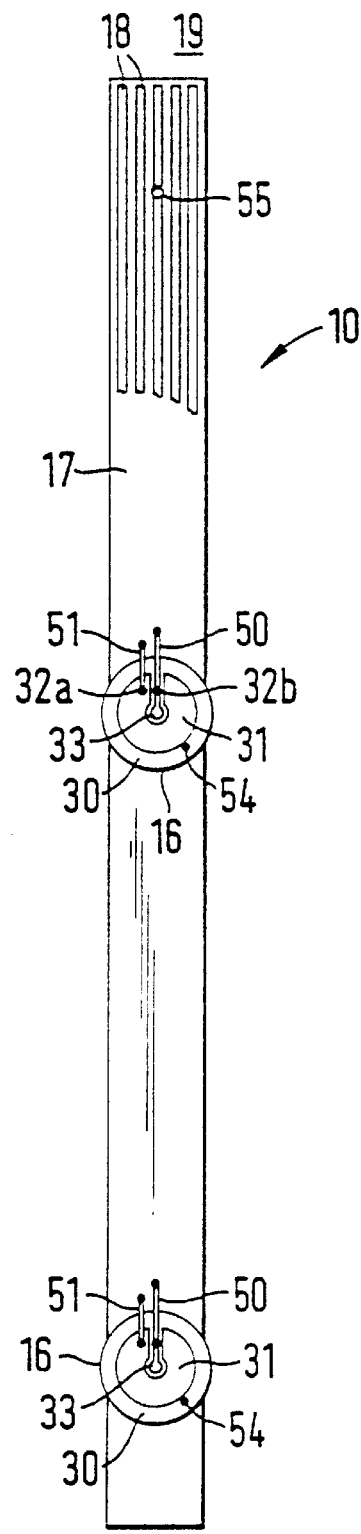
FIG. 2 is a plan view similar to FIG. 1 showing the probe without its connector.
Figure 5:
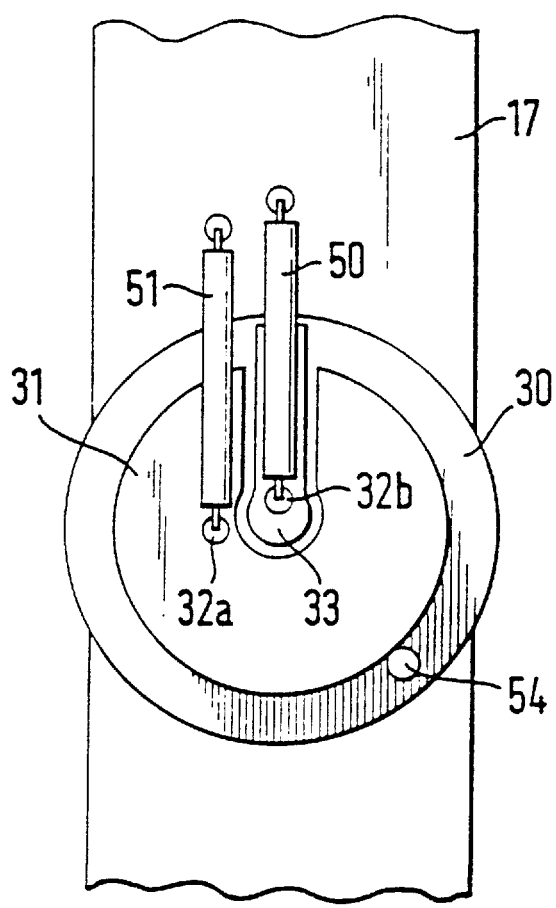
FIG. 5 is an enlarged detail of FIG. 1 showing the connection of one of the piezoelectric elements to the printed circuit board.
Figure 6:
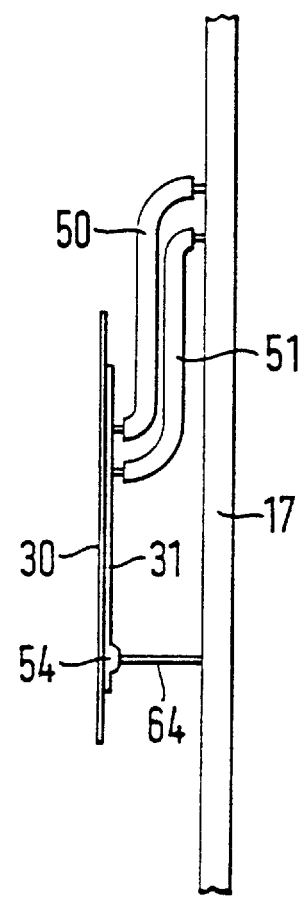
FIG. 6 is a side view of the mounting shown in FIG. 5.

In FIGS. 1 and 2 the ceramic disc 31 is shown facing outwards but, in practice, as shown in FIGS. 5 and 6, the disc 31 faces inwardly toward the printed circuit board 17.

Each piezo ceramic element 16 is mounted on the printed circuit board 17 by a short piece of rigid wire 64 (FIG. 6) which spaces the ceramic disc 31 from the tracks 18 on the board while at the same time connecting a first selected one of the tracks to an electrode 54 on the metal plate 30. The electrode 54 is positioned as close as possible to the nodal ring of the assembly which normally lies at about ⅔ of the diameter of the plate 30 and is therefore overlapped by the ceramic disc 31.

A second selected one of the tracks 18 is connected by flexible wire 51 to the silver electrode 32a on the ceramic disc 31, and a third selected track is connected by flexible wire 50 to the silver electrode 32b on the voltage-generating island 33. The piezoelectric element 16 is of the self-drive type in which the signal from electrode 32b provides a feedback signal to a self-oscillating circuit, and the drive signal from the oscillating circuit is applied across the electrode 32a on the disc 31 and the electrode 54 on the metal backing plate 30.

In use. the probe 10 is inserted into a container containing the fluid whose level is being sensed. The top end of the probe will carry the monitoring circuit (not shown) and is provided with a connector 13 for the attachment of either a gauge 60 (FIG. 4b) or a RF transmitter unit 61a, 61b (FIGS. 4a and 4c). The gauge 60 will respond to the output of the monitoring circuit to provide an indication of the level of fluid depending on the number of sensing elements immersed in the fluid. Similarly, the transmitter unit 61a or 61b will transmit such an indication as a modulated RF signal to a respective remote receiver 62a, 62b (FIGS. 4a and 4b).

Figure 3:
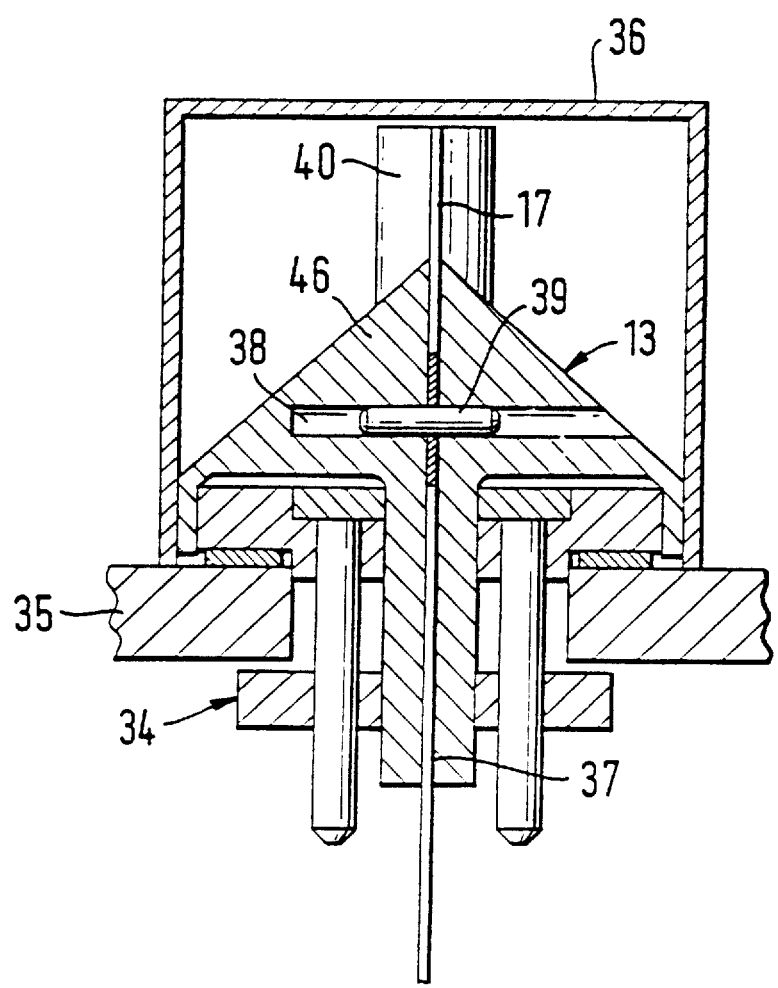
FIG. 3 is a schematic sectional view of the top end of the probe fitted to an oil storage tank.

In one particular application, the probe is inserted into an oil storage tank of the type used for domestic central heating. In this case, as shown in FIGS. 3 and 4, the connector 13 at the top end of the probe is inserted into a gland 34 fitted to the top wall 35 of the tank. The connector 13 with the exposed top end of the printed circuit board 17 then projects upwardly from the tank and may be fitted with a protective cap 36 when not in use.

The upper part of connector 13 comprises a conical head 46 with a vertical slot 37 through which the printed circuit board 17 extends. A bore 38 extends generally perpendicular to the slot 37, and the board 17 is retained in the slot 37 by a pin 39 in the bore 38 which passes through a corresponding hole 55 in the board. The conical head 46 provides a run-off for any fluid that comes into contact with the connector. Aligned with the board 17, and positioned at the outer edges of the connector, are two lugs 40. Lugs 40 not only provide protection against accidental damage to the board but also act as guide pins when fitting the gauge 60 or transmitter units 61a, 61b to the sensor probe.

FIGS. 1 and 2 illustrate a 2-point probe. Such a probe is particularly useful when a tanker driver is filling a domestic oil storage tank. A first warning indication is then provided when the lower of the two piezoelectric elements 16 is immersed in the oil, and a final "stop" indication is provided when the upper element is immersed. The indications are relayed by frequency modulating a RF carrier signal from the transmitter 61a to the remote receiver 62a (FIG. 4) held by the tanker driver.

Where it is important to monitor the level of a fluid as it rises or falls over a wide range. the number of piezoelectric elements spaced along the probe can be increased. For example, a 10-point probe might be used for an oil storage tank to provide information on the level of oil in the tank to a domestic or commercial user. The gauge 60 (FIG. 4b) attached to the connector 13 would then provide an appropriate read-out as each piezoelectric element was uncovered. It would also be possible to provide a remote gauge 62b in the premises of the user, and to relay the data to a receiver in the gauge using the radio transmitter 61b (FIG. 4c) fitted to the connector 13 and modulating or encoding the RF carrier-signal. In this case the receiver could be connected to a telephone link and could automatically transmit a coded "re-order" signal to a selected telephone number in response to a signal from the sensor probe indicating that the level of oil had dropped below a predetermined minimum level.

For a 10 -point probe, the strip of printed circuit board might have a width of 15 mm and a length of up to 10 meters.

A circuit for operating each of the fluid level sensor probes described above is separately described in our copending application \_\_\_\_ based on British application 9408176.7 and being filed concurrently herewith.

Figure 8A:
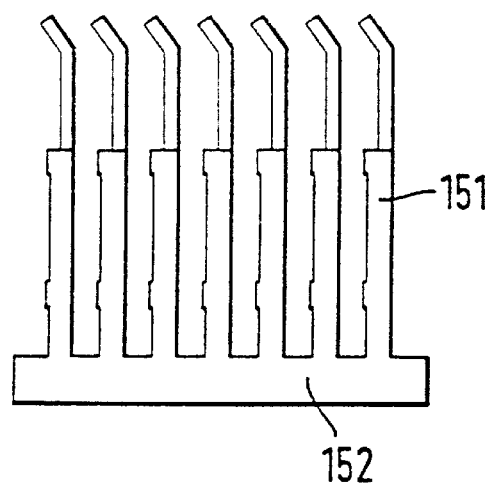
FIGS. 8(A–D) shows various stages in the formation of a spring contact for the sensor of FIG. 7.
Figure 8B:
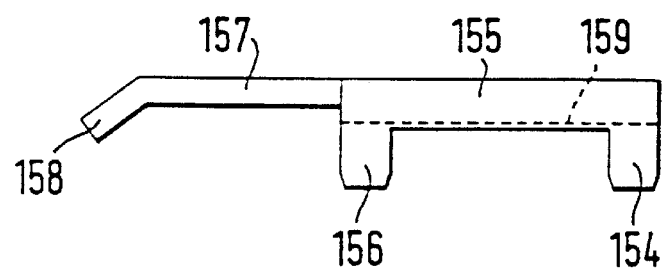
Figure 8C:
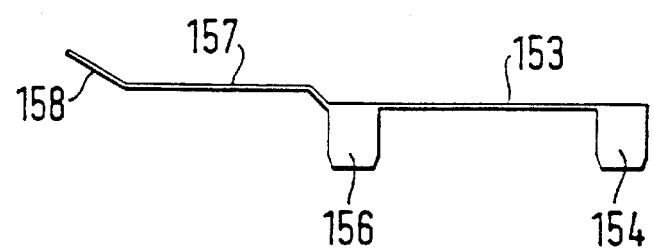
Figure 8D:
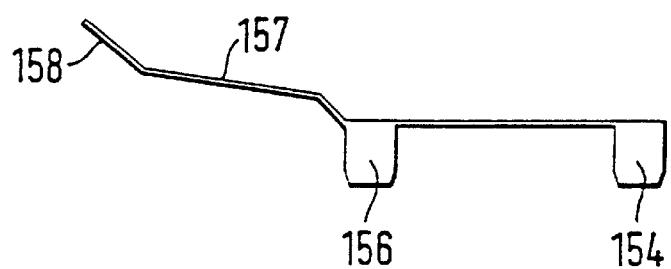
Figure 9:
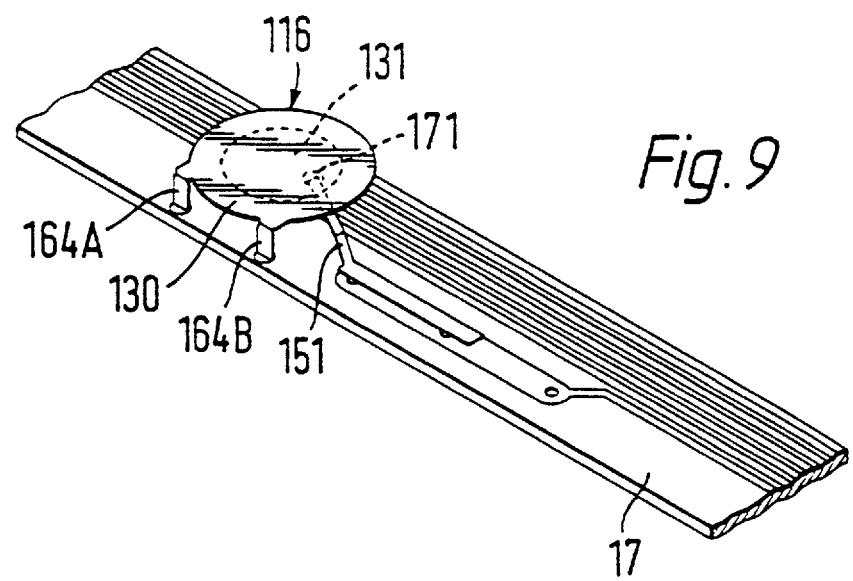
FIG. 9 is a perspective view of the piezo sensor of FIGS. 7 and 8.

In a further embodiment illustrated in FIGS. 7–12, the piezo element is not of the self-drive type and does not have a separate voltage generator 33. In FIGS. 7–9 piezo element 116 comprises a metal resonating plate 130 bonded to a smaller diameter piezo ceramic disc 131, the plate 130 having two mounting legs 164A and 164B extending from the edge of the plate. Such elements are conventionally used as sound generating elements in alarm circuits. The resonating plate 130 is formed from a thin metal sheet by a press mould, and notches 166A, B, C, D are cut in the plate at the joint with the legs. Engagement notches 167A, B are cut at the ends of the respective legs 164A and B so that the legs may engage with corresponding holes in a printed The legs 164A, B. intially formed in the same plane as the plate 130, are bent into a position generally perpendicular with respect to the plate. The notches 166A, B, C, D aid the bending and in use enhance the resonant properties of the plate 130. The legs are fixed rigidly to the PCB by solder so that the plate is supported with minimum damping of the vibrating plate; this is achieved partly by the notches 166A. B, C, D which reduce the size of the joint between the vibrating plate and the rigid legs. Accordingly, the legs provide an acoustic block of high impedance to the vibrations, and reduce absorption of the vibrations.

Figure 7A:
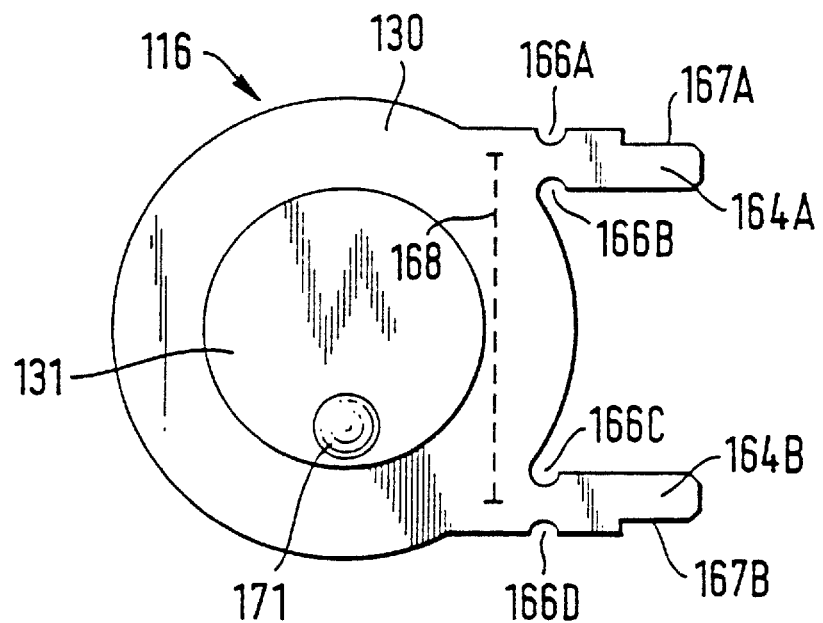
FIG. 7(A) shows a plan view of an alternative piezo sensor (legs flat)
Figure 7B:
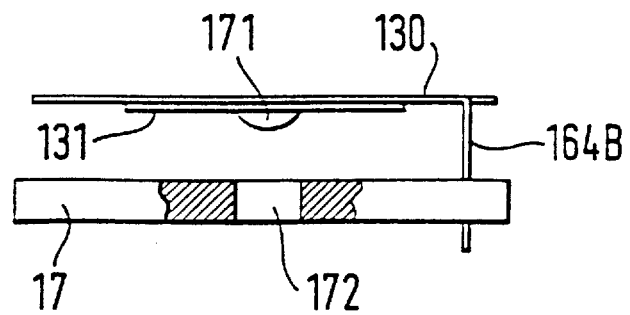
FIG. 7(B) shows a side view of the piezo sensor (legs bent)

The legs 164A, B are positioned at the ends of a chord 168 across the circular plate 130. The length of the chord 168 may be a full diameter but it has been found that a chord length of less than a diameter provides a desirable resonance mode in the plate. The most preferred chord length is, as shown in FIG. 7A, approximately that which would allow four chords of similar length to be connected around the circular plate.

The flexible wires 50, 51 in the previous embodiment are replaced in this embodiment by a conducting spring contact 151. The spring contact 151 is connected at one end to a track on the PCB 17 and at the other end to the piezo ceramic disc 131 by means of solder joints for electrical mechanical connections. Accordingly, the spring contact provides the electrical path between the PCB track and the piezo disc.

The spring contact 151 is formed from a pliable metal strip by a press and several strips may be formed together in a comb 152 as shown in FIG. 8A. The spring contact, shown removed from the comb in FIG. 8B, comprises a body portion 155, leg portions 154, 156, neck portion 157 and head portion 158. In FIG. 8C the body portion 155 has been folded along the line 159 so that the plane of the head 158 and neck 157 are substantially perpendicular to the legs 154 and 156. The neck 157 is kinked as indicated in FIG. 8C. This allows for better positioning of the spring contact so that the body portion 155 does not interfere with the resonating plate 116. In FIG. 8D the neck 157 and the head 158 have been bent into the biased position as indicated.

In fabrication, each spring contact 151 is positioned on a PCB with the legs 154, 156 fitting into pre-drilled holes. Preformed piezo element 116 is positioned on the PCB with its legs 164A and 164B fitting into corresponding pre-drilled holes. As the legs 164A and 164B are pushed into position, a pre-soldered contact point 171 (FIG. 7) on the ceramic disc 131 abuts the biased head 158 of the contact spring 151. The legs of the piezo element and the legs of the spring contact are then soldered to respective tracks on the PCB. A hole 172 (FIG. 7B) in the PCB 17 directly beneath the pre-soldered connection point 171 allows heat from beneath the PCB to reach and thereby melt the solder when connecting the head 158 of the spring contact to the ceramic disc.

The position of the pre-soldered connection point 171 at a point on the edge of the ceramic disc ensures that the connection is made at a point of minimum vibration. This reduces the movement of the spring contact which in turn decreases the wear and limits the damping effect of the spring.

Figure 10:
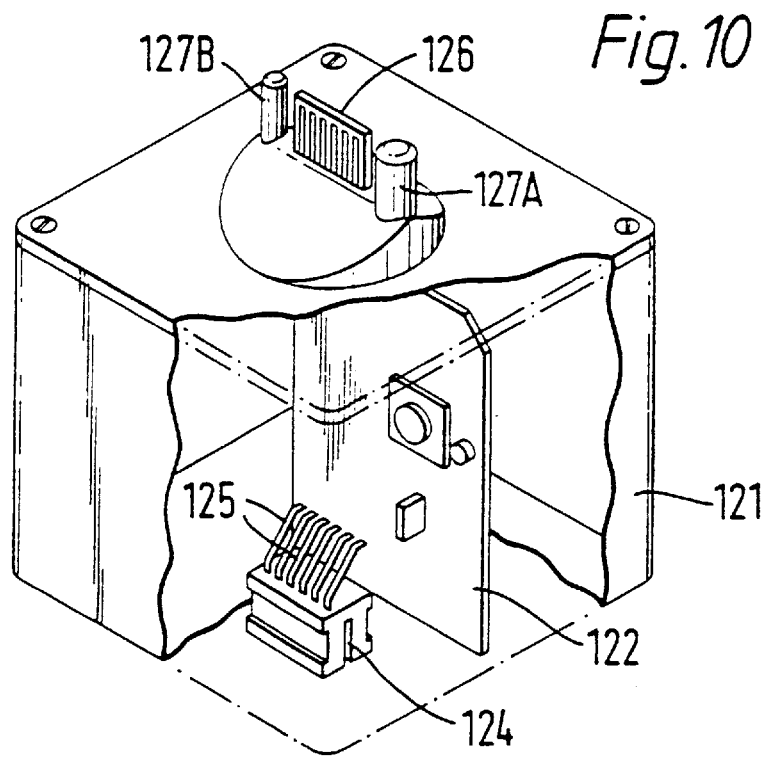
FIG. 10 is a perspective cut-away view of a control box.
Figure 11:
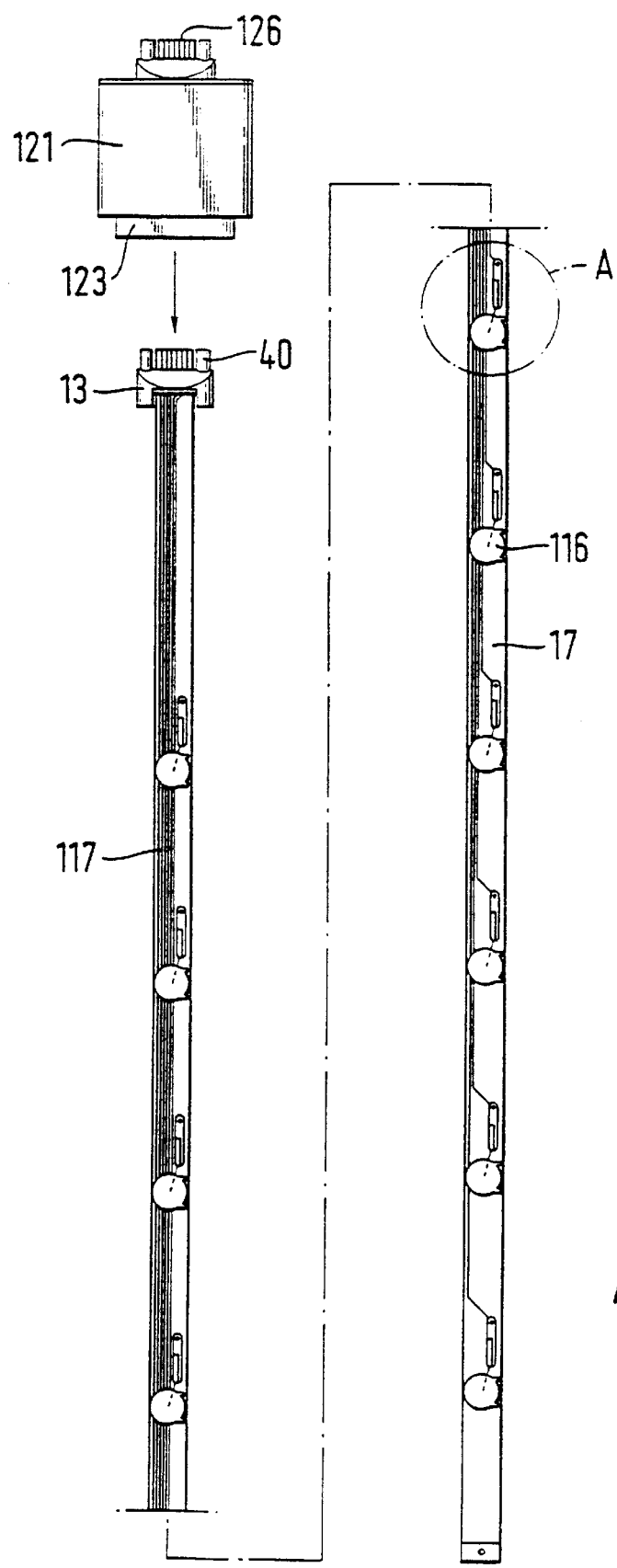
FIG. 11 shows a front view of a ten point probe using the sensor of FIGS. 7–9 and the control box of FIG. 10.
Figure 12:
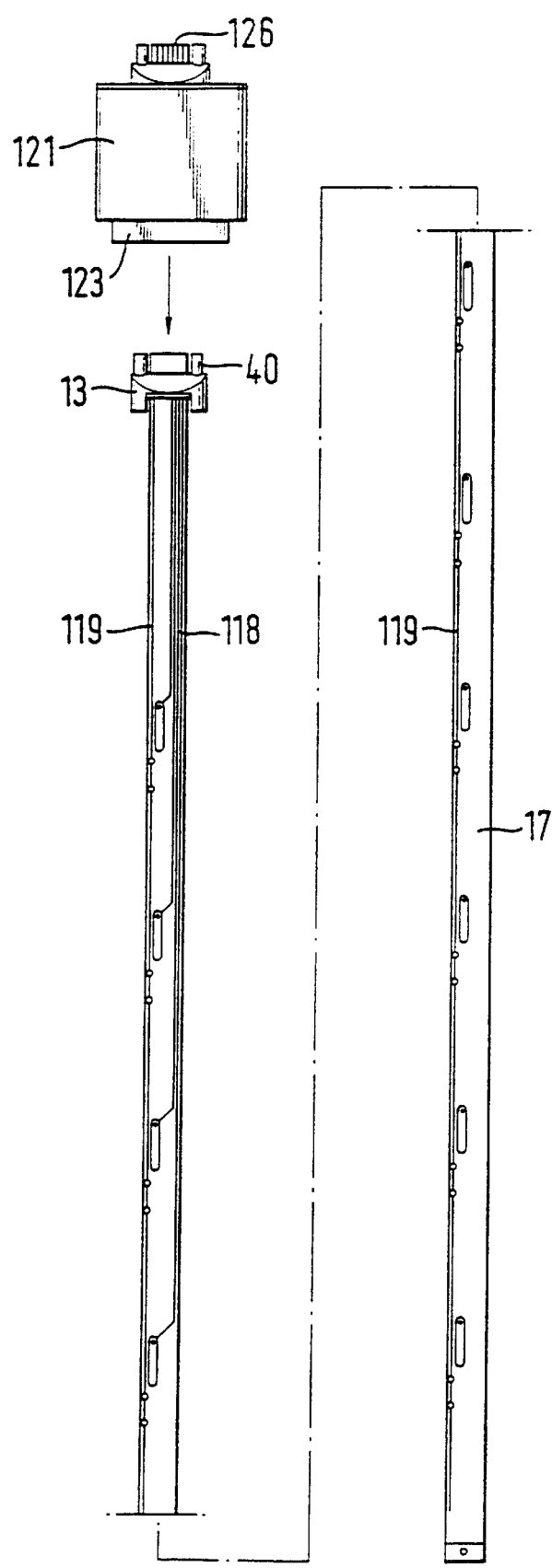
FIG. 12 is a rear view of the probe of FIG. 11.

In the embodiment of FIGS. 7–12, the top end of the PCB 17 includes a connector 13 corresponding to that used in the embodiment of FIGS. 1–6, and the connector 13 plugs into the base 123 of a control box 121 (FIGS. 10–12). Control box 121 contains a microcontroller on a PCB 122 as shown in FIG. 10 and connects to the top of the PCB 17 as shown in FIGS. 11 and 12.

The exposed top end of the PCB 17 between the lugs 40 of the connector 13 is received in a socket 124 within the base 123 of the box 121, the socket 124 having fixed electrical connections 125 for connecting each of the tracks on the PCB 17 to the microcontroller (not visible in the figure) on the reverse side of the PCB 122.

The output terminals of the microcontroller circuit on PCB 122 are then provided on a projecting portion 126 of the PCB disposed between a pair of lugs 127a, 127b so that a gauge or radio transmitter can be fitted shown in FIG. 4. FIG. 11 shows a front plan view of a multi-point sensor probe using the sensor elements of FIGS. 7–9. Ten piezo sensors 116 of the type shown in FIGS. 7–9 are spaced along the front of the PCB 17 and five printed tracks 117 extend down the board and connect to the bottom five sensors.

FIG. 12 shows a rear plan view of the probe shown in FIG. 11, the rear face of the PCB 17 carrying five tracks 118 connecting to the top five piezo sensors 116 and a common track 119.

The sensor probes shown in FIGS. 1–6 and in FIGS. 7–12 can be used in general to detect the level of a fluid, and particularly the level of oil in an oil storage tank. However, the probes could also be used to detect other characteristics of the medium surrounding the probe, such as the viscosity of a liquid, and could also be of use, for example, in powder technology.

What is claimed and desired to be secured by Letters Patent of the United States is:

1. A piezoelectric sensor probe (10) comprising an elongate, insulative, support member (17) that supports a plurality of piezoelectric sensing elements (16, 116) spaced from each other along a length of the member, the support member (17) has respective pairs of conductors (18, 117, 118, 119) that extend from one end of the member separately to each of the sensing elements for conducting electrical signals separately to and from each sensing element, each sensing element (16, 116) is supported by the support member (17) and suspended from a surface of said support member such that the sensing element (16, 116) is free to expand and contract substantially independently of the support member (17) when an electrical signal is applied to the sensing element along a respective conductor.

2. A piezoelectric sensor probe according to claim 1, further comprising an electrical connector (13) at one end of the support member (17) for connecting the respective conductors (18, 117, 118, 119) from each sensing element (16, 116) to a monitoring circuit for monitoring an electrical characteristic of each of the sensing elements dependent on a medium surrounding the respective elements.

3. A piezoelectric sensor probe according to claim 1, in which the support member (17) comprises a strip of printed circuit board, and the conductors (18, 117, 118, 119) comprise conductive tracks on the board.

4. A piezoelectric sensor probe according to claim 2, in which the support member (17) comprises a strip of printed circuit board, and the conductors (18, 117, 118, 119) comprise conductive tracks on the board.

5. A piezoelectric sensor probe according to claim 3, in which each sensing element (16, 116) comprises a piezo ceramic disc (31, 131) bonded to a backing member (30, 130), the backing member comprising a metal and being electrically connected to one or more of the conductive tracks (18, 117, 118, 119) on the printed circuit board.

6. A piezoelectric sensor probe according to claim 5, in which the electrical connection also provides a cantilever mounting of the metal backing member (30, 130) in a spaced relationship with the printed circuit board.

7. A piezoelectric sensor probe according to claim 6, in which the electrical connection comprises a leg (64, 164) depending from the backing member.

8. A piezoelectric sensor probe according to claim 7, in which the backing member (30, 130) is notched in a region of a joint between the leg and the backing member.

9. A piezoelectric sensor probe according to claim 5, in which a resilient contact arm (151) connects the piezo ceramic disc (31, 131) to another of the conductive tracks on the printed circuit board.

10. A piezoelectric sensor probe according to claim 6, in which a resilient contact arm (151) connects the piezo ceramic disc (31, 131) to another of the conductive tracks on the printed circuit board.

11. A piezoelectric sensor probe according to claim 9, in which the contact arm (151) includes a kink.

12. A piezoelectric sensor probe as set forth in claim 1, which includes a monitoring circuit connected to the conductors (18, 117, 118, 119) at the said end of the probe for sending signals to and receiving signals from each sensing element (16, 116);

whereby the monitoring circuit sends a signal to each element and monitors a return signal from each element to determine any variation in the characteristic of the respective elements along the probe (10).

13. A piezoelectric sensor probe according to claim 12, wherein a variable characteristic is a resonant frequency or a characteristic associated with a resonant frequency.

14. A piezoelectric sensor probe according to claim 12, wherein the monitoring circuit comprises a microprocessor for controlling the sending and receiving of signals to and from each sensing element.

15. A piezoelectric sensor probe according to claim 13, wherein the monitoring circuit comprises a microprocessor for controlling the sending and receiving of signals to and from each sensing element.

16. A piezoelectric sensor probe according to claim 12, wherein the monitoring circuit separately accesses each sensing element to determine the characteristic of the element.

17. A piezoelectric sensor probe according to claim 12, further comprising a transmitter (61) for transmitting an output signal from the monitoring circuit to a remote receiver (62).

18. A piezoelectric sensor probe according to claim 17, in which the receiver (62) is connected to a telephone link and includes means responsive to the transmitted signal for transmitting a coded signal to a preselected telephone number whenever the output signal from the monitoring circuit has a predetermined indication.

19. A piezoelectric sensor probe according to claim 18, in which the monitoring circuit monitors a level of oil in an oil storage tank (35), and the coded signal is transmitted to the preselected telephone number whenever the level of oil falls below a predetermined minimum value.

20. A method of determining a full storage tank (35) with fluid supplied from a location remote from the tank, which comprises assembling at least a first and second sensor probe onto a support with the first and second probes spaced from each other along a length of said support with each probe spaced from a face of said support, connecting each of said probes to a signal receiver, inserting said support with said first and second sensor probes (10) thereon into a tank with said first and second probes spaced vertically from each other, transmitting a first signal from the first sensor probe (10) to a receiver (62) at a remote location when the fluid in the tank reaches the first of the sensing elements and transmitting a second signal from the second sensor probe (10) to the said receiver (62) when the fluid in the tank reaches the second of the sensing elements whereby the rate of filling can be reduced in response to the first signal indicating that the tank is almost full and filling can be terminated in response to the second signal indicating that the tank is full.

\* \* \* \* \*